(12) United States Patent
Seita

(10) Patent No.: US 9,754,373 B2
(45) Date of Patent: Sep. 5, 2017

(54) METHODS AND APPARATUS FOR AUTOMATED BOCCE MEASUREMENT AND SCORING

(71) Applicant: Gregory J. Seita, Liverpool, NY (US)

(72) Inventor: Gregory J. Seita, Liverpool, NY (US)

( * ) Notice: Subject to any disclaimer, the term of this patent is extended or adjusted under 35 U.S.C. 154(b) by 166 days.

(21) Appl. No.: 14/552,113

(22) Filed: Nov. 24, 2014

(65) Prior Publication Data

US 2015/0146003 A1   May 28, 2015

Related U.S. Application Data

(60) Provisional application No. 61/908,418, filed on Nov. 25, 2013.

(51) Int. Cl.
*G06T 7/60* (2017.01)
*G06T 7/00* (2017.01)
*G06T 7/73* (2017.01)

(52) U.S. Cl.
CPC ............... *G06T 7/004* (2013.01); *G06T 7/60* (2013.01); *G06T 7/73* (2017.01); *G06T 2207/10024* (2013.01); *G06T 2207/30224* (2013.01)

(58) Field of Classification Search
CPC ......... G06T 7/004; G06T 7/0042; G06T 7/60; G06T 2207/10024; G06T 2207/30224
See application file for complete search history.

(56) References Cited

U.S. PATENT DOCUMENTS

| | | | |
|---|---|---|---|
| 4,893,182 A | 1/1990 | Gautraud et al. | |
| 5,125,669 A * | 6/1992 | Kanda | A63B 67/068 273/118 R |
| 6,133,946 A | 10/2000 | Cavallaro et al. | |
| 7,881,499 B2 * | 2/2011 | Bissonnette | A63B 24/0021 382/106 |
| 2011/0022202 A1 * | 1/2011 | Lundback | A63D 15/20 700/92 |
| 2011/0116071 A1 * | 5/2011 | Neary | A63B 67/068 356/3 |
| 2012/0154593 A1 * | 6/2012 | Anderson | H04N 5/222 348/157 |

FOREIGN PATENT DOCUMENTS

EP   2133846   * 12/2009

* cited by examiner

*Primary Examiner* — Thai Tran
*Assistant Examiner* — Christopher T Braniff
(74) *Attorney, Agent, or Firm* — Bond, Schoeneck & King, PLLC; Blane Bettinger

(57) ABSTRACT

Systems and methods for measuring distances between a pallino and one or more bocce balls on a bocce court. More particularly, one or more cameras are mounted above the bocce court which detect the position of the bocce balls and the pallino and use one or more algorithms to make a distance measurement from each bocce ball to the pallino. These distances can then be sorted from closest to furthest such that scoring results can instantly be shown on a monitor mounted in or near the bocce court. A scoring function can keep track of a cumulative score, round by round, until a team or player is declared the winner.

6 Claims, 4 Drawing Sheets

METHODS AND APPARATUS FOR AUTOMATED BOCCE MEASUREMENT AND SCORING

CROSS-REFERENCE TO RELATED APPLICATIONS

This application claims priority to U.S. Provisional Patent Application Ser. No. 61/908,418, filed on Nov. 25, 2013, and entitled "Methods and Apparatus for Automated Bocce measurement and Scoring," the entire disclosure of which is incorporated herein by reference.

BACKGROUND

The present invention relates to measurement and scoring systems. More particularly, the invention relates to means and methods of using imaging technology to measure distances between balls used in playing bocce.

Bocce is a game developed in Italy, a descendant of ancient games played during the time of the Roman Empire. Overseen by the International Bocce Federation, the game has grown in popularity all around the world. To play bocce, one of two players (or teams) throws a small ball called a pallino (also known as a jack or boccino) from one end of a court that is usually 27.5 meters (approximately 90 feet) in length and 2.5 to 4 meters (approximately 8.2 to 13.1 feet) wide. The players or teams then throw or roll the larger bocce ball onto the court, attempting to place their ball closer to the pallino than the closest ball of the other team. The player or team with the ball closest to the pallino can score, and they score one point for each ball that is closer to the pallino that the closest ball of the other player or team. Playing continues until a winning score is achieved, which can vary by region.

Unfortunately, scoring can be complicated by difficulty in determining which team or player has a ball closest to the pallino. Too many times the game of bocce resorts to a manual approach in determining what colored bocce ball is closest to the pallino. Manual measurements entail using tape rules or other manual measuring devices that can involve human error and lead to further complications resulting in arguments of what team's bocce ball is actually closest to the pallino. Repeated measurements plus added arguments can extend a single round of bocce by as much as 20 minutes or more.

Accordingly, there is a need in the art to provide methods and apparatus to measure distances between balls used in playing bocce, and that overcome one or more drawbacks of existing manual techniques of measurement.

BRIEF SUMMARY

The present disclosure is directed to systems, apparatus, and methods for measuring distances between the pallino and one or more bocce balls on a bocce court. More particularly, the invention relates to the use of one or more cameras that overhangs a bocce court to measure distances between balls used in playing bocce, thereby minimizing or eliminating the potential for human error. One or more overhanging cameras are mounted above the bocce court. These cameras detect the position of all bocce balls and the pallino, and use one or more algorithms to make a linear measurement from each bocce to the pallino. The recorded distances can then be sorted from closest to furthest such that scoring results can instantly be shown on a monitor mounted in or near the bocce court. Players only need to look at a monitor to determine what team is closest to the pallino and play continues based on what team is furthest away from the pallino. According to an embodiment, a scoring function keeps track of a cumulative score, round by round, until a team or player is declared the winner.

According to an aspect, a method of measuring distances between two or more balls on a bocce court is provided. The method includes the steps of: (i) providing one or more cameras, each of the one or more cameras positioned above the court and configured to image at least a portion of the bocce court; (ii) obtaining an image of the bocce court from at least one of the one or more cameras; (iii) calculating, using the image, a distance between two of the balls on the bocce court.

According to an embodiment, the method includes the step of providing a processor configured to receive the image of the bocce court from the camera, and further configured to perform the calculating step.

According to an embodiment, each of the one or more cameras positioned above the court is configured to image only a portion of the bocce court. According to an embodiment, each of two of the cameras positioned above the court is configured to image an overlapping portion of the bocce court. According to an embodiment, only a single camera is positioned above the court and configured to image at least a portion of the bocce court.

According to an embodiment, the method includes the step of communicating the obtained image of the bocce court from at least one of the one or more cameras to a remote transceiver.

According to an embodiment, the method includes the steps of detecting, using the image, a plurality of balls on the bocce court, and assigning coordinates to each detected ball on the bocce court.

According to an embodiment, the method includes the steps of detecting, using the image, a plurality of balls on the bocce court, and determining, using the image, the identity of each detected ball.

According to an embodiment, the method includes the steps of assigning coordinates to each detected ball on the bocce court, determining a distance between each detected ball on the bocce court and a ball determined to be the pallino, and assigning points to one of two players or teams based on the determined distances.

According to an aspect is a system for distances between two or more balls on a bocce court. The system includes: (i) one or more cameras configured to be positioned above at least a portion of the bocce court and further configured to obtain an image of the portion of the bocce court; and (ii) a processor in communication with the one or more cameras, the processor configured to calculate, using the image, a distance between two or more balls on the bocce court.

According to an embodiment, each of the one or more cameras is configured to image only a portion of the bocce court. According to an embodiment, each of two cameras is configured to image an overlapping portion of the bocce court.

According to an embodiment, the one or more cameras comprise a transceiver configured to communicate an obtained image to the processor.

According to an embodiment, the processor is further configured to detect, using the image, a plurality of balls on the bocce court, and further configured to assign coordinates to each detected ball on the bocce court.

According to an embodiment, the processor is further configured to detect, using the image, a plurality of balls on the bocce court, and further determine, using the image, the identify of each detected ball.

According to an embodiment, the processor is further configured to assign coordinates to each detected ball on the bocce court, determine a distance between each detected ball on the bocce court and a ball determined to be the pallino, and assign points to one of two players or teams based on the determined distances.

According to an embodiment, the processor is further configured to rank each detected ball based on the determined distance.

According to an embodiment, the processor is a handheld computing device.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION

According to an embodiment is a system for measuring distances between the pallino and one or more bocce balls on a bocce court. More particularly, one or more digital cameras are mounted above the bocce court. These cameras detect the position of all played bocce balls and the pallino, and use one or more algorithms to make a linear measurement from each bocce to the pallino. The recorded distances can then be sorted from closest to furthest such that scoring results can instantly be shown on a monitor mounted in or near the bocce court. Players only need to look at a monitor to determine what team is closest to the pallino and play continues based on what team is furthest away from the pallino. According to an embodiment, a scoring function keeps track of a cumulative score, round by round, until a team or player is declared the winner.

Figure 1:
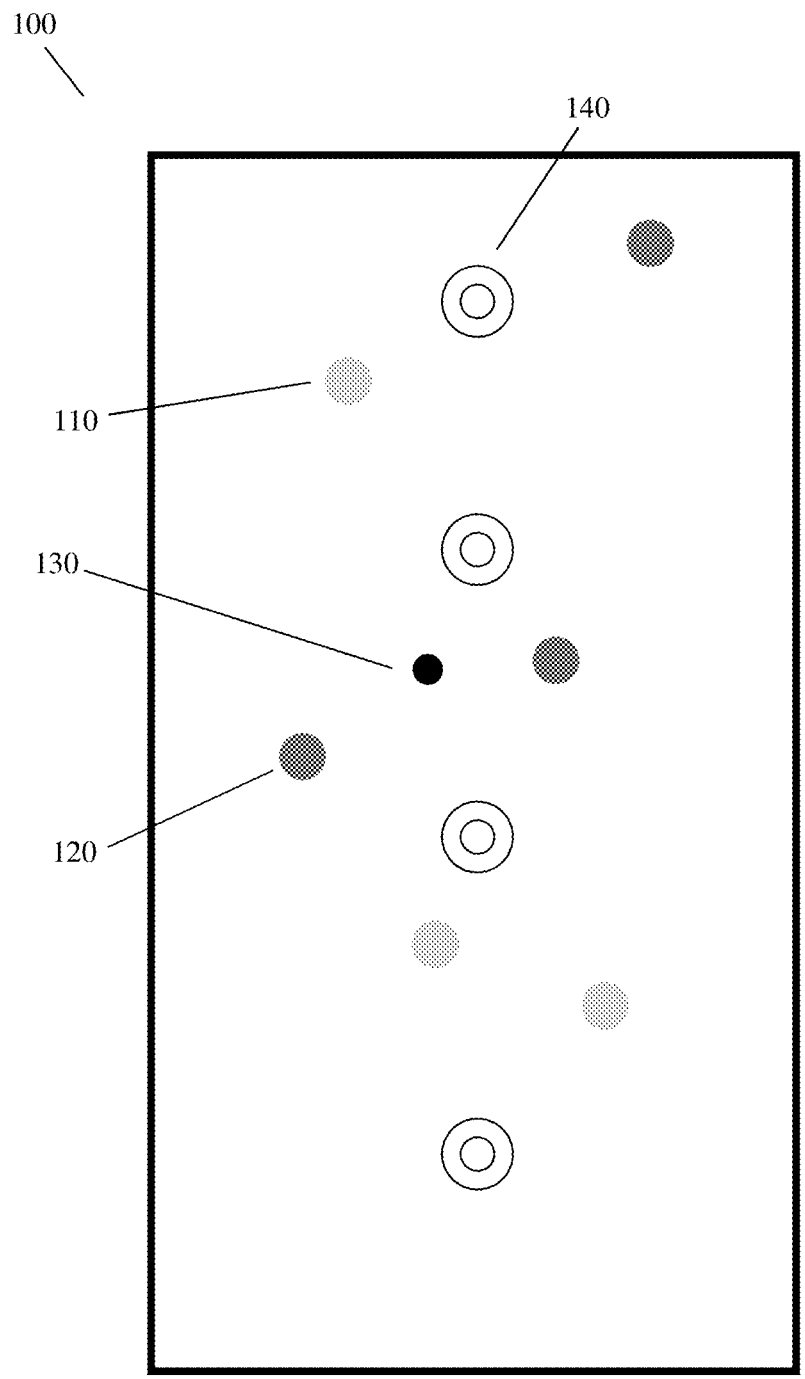
FIG. 1 is an illustration of imaging technology utilized to measure distances between balls on a bocce court, according to an embodiment.

Referring now to the drawings, wherein like reference numerals refer to like parts throughout, there is seen in FIG. 1 a top view of a bocce court 100 according to an embodiment of the invention in which one or more cameras 140 are mounted above the court. The height of each installed camera is a function of ceiling dimensions and construction. According to an embodiment, the cameras are high enough to image a substantial portion of the bocce court, but not so far as to prevent accurate measurements. Also on bocce court 100 are a first player or team's bocce balls 110, and a second player or team's bocce balls 120, as well as pallino 130.

If bocce court 100 is located indoors, the one or more cameras can be mounted to, temporarily affixed to, or suspended from the ceiling, rafters, or other structure located over the court. If bocce court 100 is located outdoors, the one or more cameras can be mounted or affixed to a temporary or permanent structure. For example, the one or more cameras can form a portion of a suspension frame that suspends the cameras above a portion of the bocce court. A simple structure can be constructed that comprises, for example, light-weight aluminum poles similar to tent poles, although many other structures are possible. At least a portion of this structure hangs over the bocce court, holds a camera, and orients the camera downward toward the bocce court for imaging purposes. This suspension frame may also be used indoors, such as for a temporary indoor bocce court.

The one or more cameras 140 can be fixed to detect balls 110, 120, and 130 on a dedicated portion of the bocce court. One or more cameras can cover the remainder of the court. Location mappings are integrated from each camera to the surface of the court. Individual cameras can then detect balls by location and translate those detected positions to perform 'distance between objects' calculations. Measured distances are analyzed, sorted from closest to furthest and displayed on a monitor for each played round. Rounds and scorings continue until the bocce game is completed.

Figure 2:
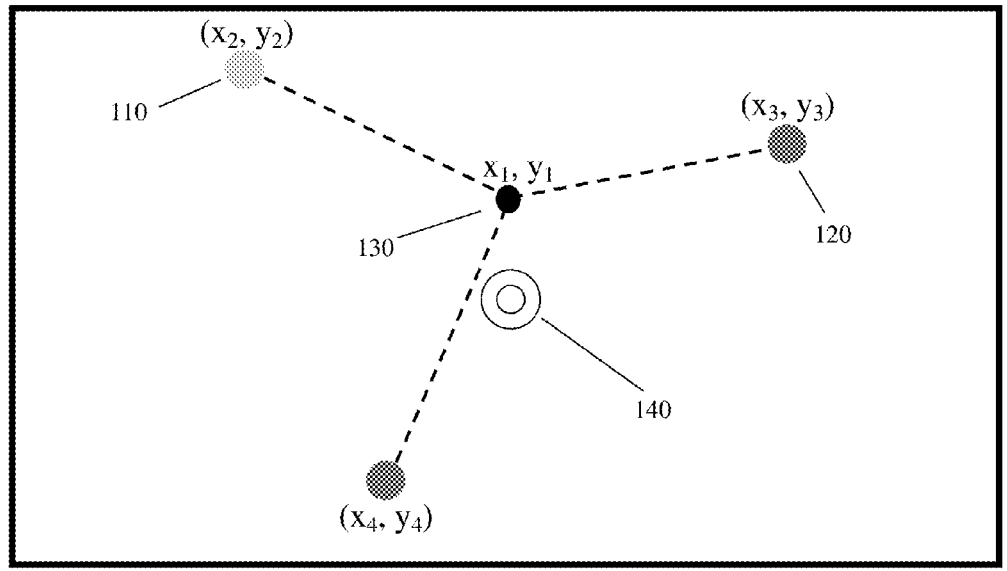
FIG. 2 is an illustration of imaging technology utilized to measure distances between balls on a bocce court, according to an embodiment.
Figure 3:
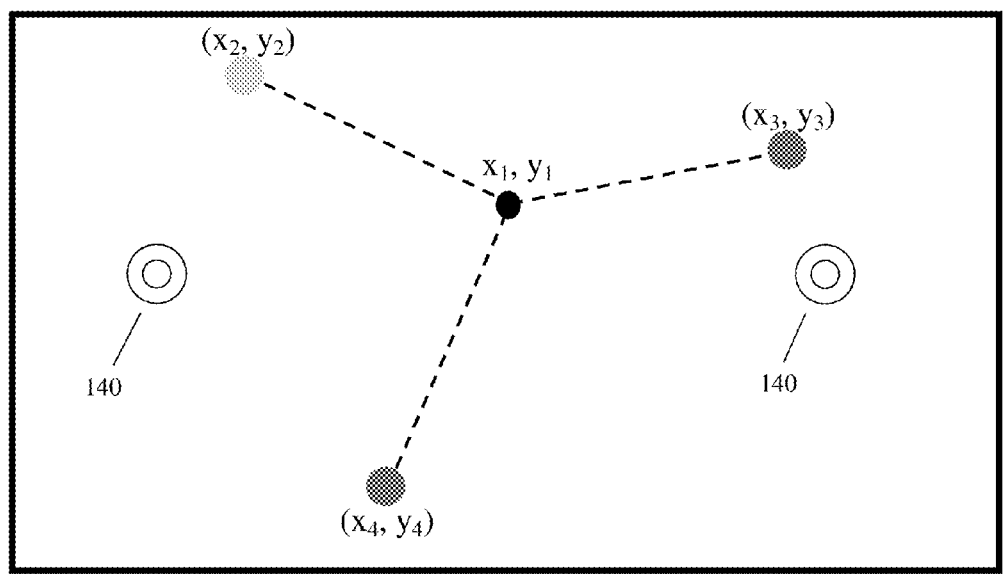
FIG. 3 is an illustration of imaging technology utilized to measure distances between balls on a bocce court, according to an embodiment.

Referring to FIGS. 2 and 3, an expanded portion of bocce court 100 is depicted with bocce balls 120 and 130, and the pallino 140, in play. Examples are shown of detecting balls by coordinate position and computed distances. According to one embodiment of the distance algorithm, a distance between two points formula (given their coordinates) is used as follows: if $x_1 y_1$ is the detected coordinate position of the pallino 140 and $x_2 y_2$ is the detected coordinate position of the first player's bocce ball 110, then the distance between the pallino 140 and first player's bocce ball 110 is xy:

$$\text{where } xy = \sqrt{(x_1-x_2)^2+(y_1-y_2)^2} \quad \text{(Eq. 1)}$$

As an example, let $x_1=35$ and $y_1=5$, and let $x_2=15$ and $y_2=20$ $$\text{then } xy = \sqrt{(35-15)^2+(5-20)^2}$$

$$xy = \sqrt{400+225}$$

$$xy = 25.$$

Similar measurements are made with all bocce balls played versus the pallino such that bocce ball rankings can be made from shortest distance to farthest distance. The closest bocce ball to the pallino is award a point. If the second closest bocce ball to the pallino belongs to the same team as the first, then two points are awarded and so on. Only the team with the closest bocce balls of the same color is awarded points. As an example, FIG. 1 depicts a round where two points are awarded to the team playing bocce balls 120. In FIG. 1, bocce balls 120 are the bocce balls of a first team or player, bocce balls 110 belong to a second team or player, the black circle is the pallino 130, and the four centered structures are cameras 140 according to an embodiment. Although four cameras are pictured in a certain configuration in FIG. 1, both the configuration and number of cameras is variable. For example, as little as one camera 140 may be sufficient, while multiple cameras may improve resolution and detection.

Figure 4:
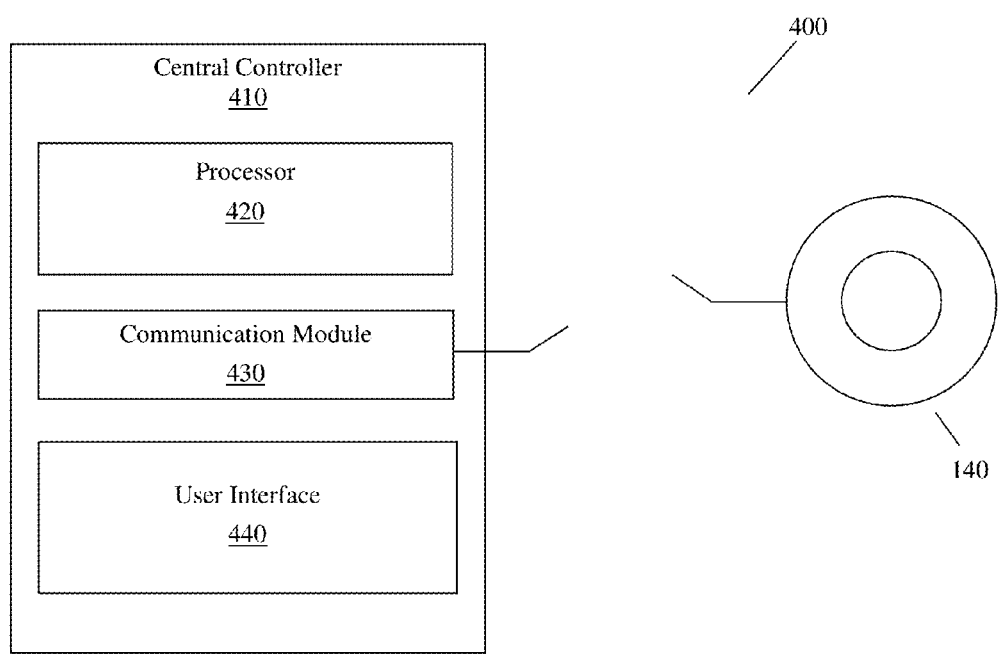
FIG. 4 is a schematic of a system for measuring distances between balls on a bocce court using imaging technology according to an embodiment.

Referring to FIG. 4 is a system 400 for the automated measurement of a bocce game. According to an embodiment, system 400 comprises one or more cameras 140. The cameras can be, but need not be, in wired and/or wireless communication with each other. Alternatively, the one or more cameras can be in wired and/or wireless communication with a central controller 410. According to an embodiment, imaging and/or mapping information can be communicated or transmitted among the cameras and/or between the cameras and the central controller 410. The central controller can include, for example, a processor 420, a communications module 430 in wired and/or wireless communication with the one or more cameras, and a user interface 440, among other modules or components. Processor 420 can be located, for example, in a computer designated specifically for processing the distance, such as a local computer or a remote computer (including but not limited to in-the-cloud and other Software as a Service applications). Alternatively, the processor can be incorporated or in communication with a smart phone, tablet, or other hand-held computing device. According to this embodiment, the computing device comprises the wired or wireless connection 430 to receive the imaging and/or mapping information, and software for performing the distance calculations and/or ranking analysis utilizing the computing device's processor.

Using the imaging and/or mapping information obtained from the cameras, processor 420 can apply one or more distance and/or ranking algorithms (such as the equation above) to calculate distances between the pallino and the bocce ball(s), and then rank the distances. To perform advanced techniques such as automated scoring, the system will include the ability to recognize the identity of each of the one or more bocce balls on the bocce court. According to this embodiment, the imaging and/or mapping data sent to the processor will include information about the identity of the ball as well as the coordinates of the ball. For example, the imaging can be performed in color and a team's bocce balls, and/or each individual bocce ball, can be different colors. As another example, a team's bocce balls, and/or each individual bocce ball, can include markings discernible by the cameras or the processor. As yet another example, a team's bocce balls, and/or each individual bocce ball, can include a Radio Frequency Identification or other internal or external method of identification.

As another example, the imaging and processing system can include the user interface 440 in which a user designates the team and/or player ownership of one or more bocce balls on the court. According to this embodiment, the system calculates the distances but requires input from the user regarding to which team or player each bocce ball belongs. The designation of ownership can be as simple as touching a touchscreen, for example. Many other methods of designation are possible.

Figure 5:
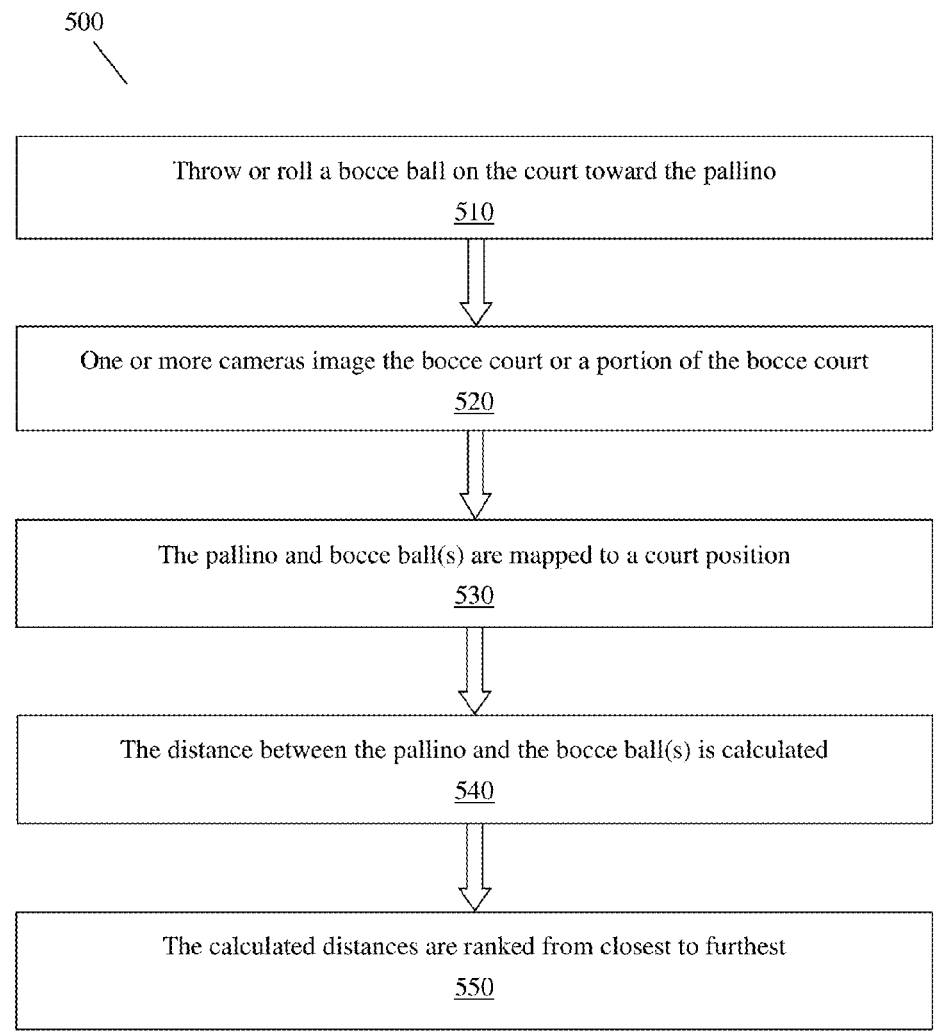
FIG. 5 illustrates a method for measuring distances between balls on a bocce court using imaging technology according to an embodiment.

According to an embodiment is a method for measuring distances between balls on a bocce court using imaging technology, depicted as method 500 in FIG. 5. At an initial step 510, the game is initiated by throwing or rolling the pallino somewhere within the bounds of the bocce court. One or more players then throws or rolls one or more bocce balls onto the court. The bocce court can be, for example, an indoor or outdoor court.

With the pallino and one or more bocce balls on the bocce court, the method can progress to step 520, in which the one or more cameras image the bocce court or a portion of the bocce court. According to one embodiment, there are multiple cameras and each camera images a portion of the bocce court with at least some overlap. According to another embodiment, a single camera images the entire bocce court. According to one embodiment, this imaging information can then be sent via a wired or wireless connection to a central processor for analysis.

At step 530, the one or more cameras and/or the processor use the imaging information to map the pallino and the one or more bocce balls. For example, as described above, each of the pallino and the bocce balls are assigned an x and y location within the court. According to one embodiment, the center position of each of the pallino and the bocce balls are determined using an algorithm, and distances are calculated according to these center locations. According to another embodiment, the periphery of the pallino and the periphery of the bocce balls are assigned an x and y location, and distances are calculated according to these periphery locations. The periphery of the bocce balls closest to the pallino is given the location assignment, and the periphery of the pallino closest to the bocce ball (individually) is given the location assignment.

At step 540, the distances between the pallino and the one or more bocce balls are calculated. According to one embodiment, the distances are calculated by one or more of the cameras. According to another embodiment, the distances are calculated by a local or remote processor, such as a dedicated computer or a handheld computing device processor. As just one example, the system is connected to an online service that receives imaging information from the one or more cameras and provides processing including distance calculation and ranking to the user, as well as scoring and other play attributes. As another example, the system is connected to a smart phone, table, or other handheld computing device that includes a software application that is configured to receive imaging information from the one or more cameras and provides processing including distance calculation and ranking to the user, as well as scoring and other play attributes.

At optional step 550, the distances are ranked from closest to furthest. According to an embodiment, the distances are ranked from shortest to longest. As described above, the system can include the ability to identify each of the bocce balls in order to associate team and/or player information with each of the distances. This will also allow the system to perform scoring and other play attribute functions.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description. Although the present invention has been described in connection with a preferred embodiment, it should be understood that modifications, alterations, and additions can be made to the invention without departing from the scope of the invention as defined by the claims.

What is claimed is:

1. A method of measuring distances between two or more balls on a bocce court, the method comprising the steps of:
providing at least two cameras, each of the at least two cameras positioned above the court and configured to image at least a portion of the bocce court wherein a first of the at least two cameras is configured to image a portion of the bocce court overlapping a portion of the bocce court imaged by a second of the at least two cameras;

obtaining an image of the bocce court from at least one of the at least two cameras, wherein a processor receives the image of the bocce court from the at least two cameras;

detecting, using the image, a plurality of balls on the bocce court;

automatically determining, using the image, which of the plurality of detected balls on the bocce court is a pallino;

automatically calculating, using the image, a distance between the pallino and each of the remaining balls on the bocce court;

automatically communicating information to a remote receiver, the information comprising a determined identity of each of the plurality of detected balls on the bocce court, and the calculated distances between the pallino and each of the remaining balls on the bocce court;

automatically assigning one or more points to at least one of two or more players or teams based on the calculated distances;

automatically displaying, on a screen, both: (i) a ranking of the plurality of non-pallino balls on the bocce court based on the calculated distance between the pallino and each of the remaining balls on the bocce court, with the one of the plurality of remaining balls on the bocce court closest to the pallino being ranked first, the one of the plurality of remaining balls on the bocce court furthest from the pallino being ranked last and (ii) the assigned points.

2. The method of claim 1, further comprising the step of: assigning coordinates to each detected ball on the bocce court.

3. A system for distances between two or more balls on a bocce court, the system comprising:
   at least two cameras each configured to be positioned above at least a portion of the bocce court and further configured to obtain one or more images of said portion of the bocce court wherein a first of the at least two cameras is configured to image a portion of the bocce court overlapping a portion of the bocce court imaged by a second of the at least two cameras; and
   a processor in communication with the one or more cameras and configured to receive the obtained one or more images, the processor further configured to automatically: (i) detect, using the image, a plurality of balls on the bocce court; (ii) determine, using the image, which of the plurality of detected balls on the bocce court is a pallino; (iii) calculate, using the image, a distance between the pallino and each of the remaining balls on the bocce court; (iv) communicate information to a remote receiver, the information comprising a determined identity of each of the plurality of detected balls on the bocce court, and the calculated distances between the pallino and each of the remaining balls on the bocce court; (v) assign one or more points to at least one of two or more players or teams based on the calculated distances; and (vi) display, on a screen, both: (a) a ranking of the plurality of non-pallino balls on the bocce court based on the calculated distance between the pallino and each of the remaining balls on the bocce court, with the one of the plurality of remaining balls on the bocce court closest to the pallino being ranked first, the one of the plurality of remaining balls on the bocce court furthest from the pallino being ranked last and (b) the assigned points.

4. The system of claim 3, wherein the one or more cameras comprise a transceiver configured to communicate an obtained image to the processor.

5. The system of claim 3, wherein the processor is further configured to assign coordinates to each detected ball on the bocce court.

6. The system of claim 3, wherein said processor is a handheld computing device.

\* \* \* \* \*